US009361176B2

(12) United States Patent
Bates et al.

(10) Patent No.: US 9,361,176 B2
(45) Date of Patent: Jun. 7, 2016

(54) DETECTING THE USE OF STALE DATA VALUES DUE TO WEAK CONSISTENCY

(71) Applicant: International Business Machines Corporation, Armonk, NY (US)

(72) Inventors: Cary L. Bates, Rochester, MN (US); Lee Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 14/314,630

(22) Filed: Jun. 25, 2014

(65) Prior Publication Data

US 2015/0378811 A1 Dec. 31, 2015

(51) Int. Cl.
*G06F 11/00* (2006.01)
*G06F 11/08* (2006.01)
*G06F 11/36* (2006.01)

(52) U.S. Cl.
CPC ............ *G06F 11/08* (2013.01); *G06F 11/3608* (2013.01); *G06F 11/3612* (2013.01); *G06F 2201/82* (2013.01); *G06F 2201/85* (2013.01)

(58) Field of Classification Search
CPC ......................... G06F 12/0815–12/0859; G06F 11/3636–11/3644; G06F 11/3006; G06F 11/3612; G06F 2201/82–2201/85; G06F 11/08
See application file for complete search history.

(56) References Cited

U.S. PATENT DOCUMENTS

| 5,655,103 A * | 8/1997 | Cheng ................. G06F 12/0833 711/124 |
| 2009/0198899 A1 * | 8/2009 | Revanuru ............ G06F 12/0842 711/128 |
| 2011/0072213 A1 * | 3/2011 | Nickolls ............. G06F 12/0862 711/122 |
| 2011/0078381 A1 * | 3/2011 | Heinrich ............. G06F 12/0842 711/122 |
| 2014/0013060 A1 * | 1/2014 | Frey .................... G06F 12/0813 711/146 |
| 2014/0127647 A1 | 5/2014 | Petri et al. |

OTHER PUBLICATIONS

Alglave et al., "Partial Orders for Efficient BMC of Concurrent Software," arXiv:1301.1629v1, Jan. 8, 2013.
Ghughal et al., "Verification Methods for Weaker Shared Memory Consistency Models," Proceedings of the workshop FMPPTA (Formal Methods for Parallel Programming: Theory and Applications), Cancun, Mexico; May 2000.
Bates et al., "Detecting the Use of Stale Data Values Due to Weak Consistency" U.S. Appl. No. 14/488,036, filed Sep. 16, 2014.
List of IBM Patents or Patent Applications Treated As Related.

* cited by examiner

*Primary Examiner* — Jason Bryan
(74) *Attorney, Agent, or Firm* — Martin & Associates, LLC; Bret J. Petersen

(57) ABSTRACT

An apparatus and method detect the use of stale data values due to weak consistency between parallel threads on a computer system. A consistency error detection mechanism uses object code injection to build a consistency error detection table during the operation of an application. When the application is paused, the consistency error detection mechanism uses the consistency error detection table to detect consistency errors where stale data is used by the application. The consistency error detection mechanism alerts the user/programmer to the consistency errors in the application program.

13 Claims, 5 Drawing Sheets

| Assembly Code | 300 |
|---|---|
| Thread1    310 | Thread2    312 |
| st 0x00(R1), 0x00<br>st 0x08(R1), ABCD<br>st 0x00(R2), 3000 | ld (R3), 0x00(R2)<br>ld (R4), 0x08(R3) |
| Where R1 = 3000, and    314<br>R2= 2000 | Where R3 should be = 3000    316<br>R4 should be = ABCD |

Consistency Error Detection Table 125

| Thread1 310 | | | | Thread2 312 | | | |
|---|---|---|---|---|---|---|---|
| 314 | 316 | 318 | 320 | 322 | 324 | 326 | 328 |
| Time | Instruction | Address | Value | Time | Instruction | Address | Value |
| 100 | store | 3000 | 0000 | 200 | load | 2000 | 3000 |
| 101 | store | 3008 | ABCD | 202 | load | 3000+8 | ABCD |
| 102 | store | 2000 | 3000 | | | | |

FIG. 4A

Consistency Error Detection Table 125

| Thread1 310 | | | | Thread2 312 | | | |
|---|---|---|---|---|---|---|---|
| 314 | 316 | 318 | 320 | 322 | 324 | 326 | 328 |
| Time | Instruction | Address | Value | Time | Instruction | Address | Value |
| 100 | store | 3000 | 0000 | 200 | load | 2000 | 0000 |
| 101 | store | 3008 | ABCD | | | | |
| 102 | store | 2000 | 3000 | | | | |

FIG. 4B

Consistency Error Detection Table 125

| Thread1 310 | | | | Thread2 312 | | | |
|---|---|---|---|---|---|---|---|
| 314 | 316 | 318 | 320 | 322 | 324 | 326 | 328 |
| Time | Instruction | Address | Value | Time | Instruction | Address | Value |
| 100 | store | 3000 | 0000 | 200 | load | 2000 | 3000 |
| 101 | store | 3008 | ABCD | 202 | load | 3000+8 | EEEE |
| 102 | store | 2000 | 3000 | | | | |

FIG. 4C

DETECTING THE USE OF STALE DATA VALUES DUE TO WEAK CONSISTENCY

BACKGROUND

1. Technical Field

This invention generally relates to computer systems, and more specifically relates to detecting the use of stale data values due to weak consistency between parallel threads of a parallel application on the computer system.

2. Background Art

Many computer systems use parallel processors and parallel programming to increase the performance of the computer system. In parallel programming there are multiple threads of a computer program executing simultaneously on multiple processors. An important concern of parallel programming is the consistency of data being used by these parallel threads of the parallel program. Strong consistency is where parallel threads can observe only one consistent state of the memory. In a weak consistency system, accesses to non-synchronized data may be seen in a different order by different threads, nodes or processors. This leads to a common problem with parallel programming where accessing values in a different order can create consistency errors from using stale data due to weak consistency. Approaches to keep the systems strongly consistent have a large negative impact on system performance, so weakly consistent architectures are often used.

BRIEF SUMMARY

An apparatus and method detects the use of stale data values due to weak consistency between parallel threads on a computer system. A consistency error detection mechanism uses object code injection to build a consistency error detection table during the operation of an application. When the application is paused, the consistency error detection mechanism uses the consistency error detection table to detect consistency errors where stale data is used by the application. The consistency error detection mechanism alerts the user/programmer to the consistency errors in the application program.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

FIG. 4A through 4C illustrate examples of stale data in a consistency error detection table and how consistency errors can be detected;

DETAILED DESCRIPTION

An apparatus and method is described for detecting the use of stale data values due to weak consistency between parallel threads on a computer system. A consistency error detection mechanism uses object code injection to build a consistency error detection table during the operation of an application. When the application is paused, the consistency error detection mechanism uses the consistency error detection table to detect consistency errors where stale data is used by the application. The consistency error detection mechanism alerts the user/programmer to the consistency errors in the application program.

While some prior art tools are capable of detecting run time problems like memory leaks, uninitialized storage references, array bounds being exceeded, etc., these tools are unable to detect if the program is actually using a stale value. One of the problems with detecting stale values is that stale values are often used with no negative consequences. If run-time analysis tools signaled an error every time a stale value is referenced, it would signal many meaningless occurrences for many threaded applications. It is preferable to determine if the application is accessing a stale value that constitutes a consistency error that could have negative consequences on program execution before generating an error condition. This allows the programmer to focus on areas of the code that are a genuine concern for program integrity.

Figure 1:
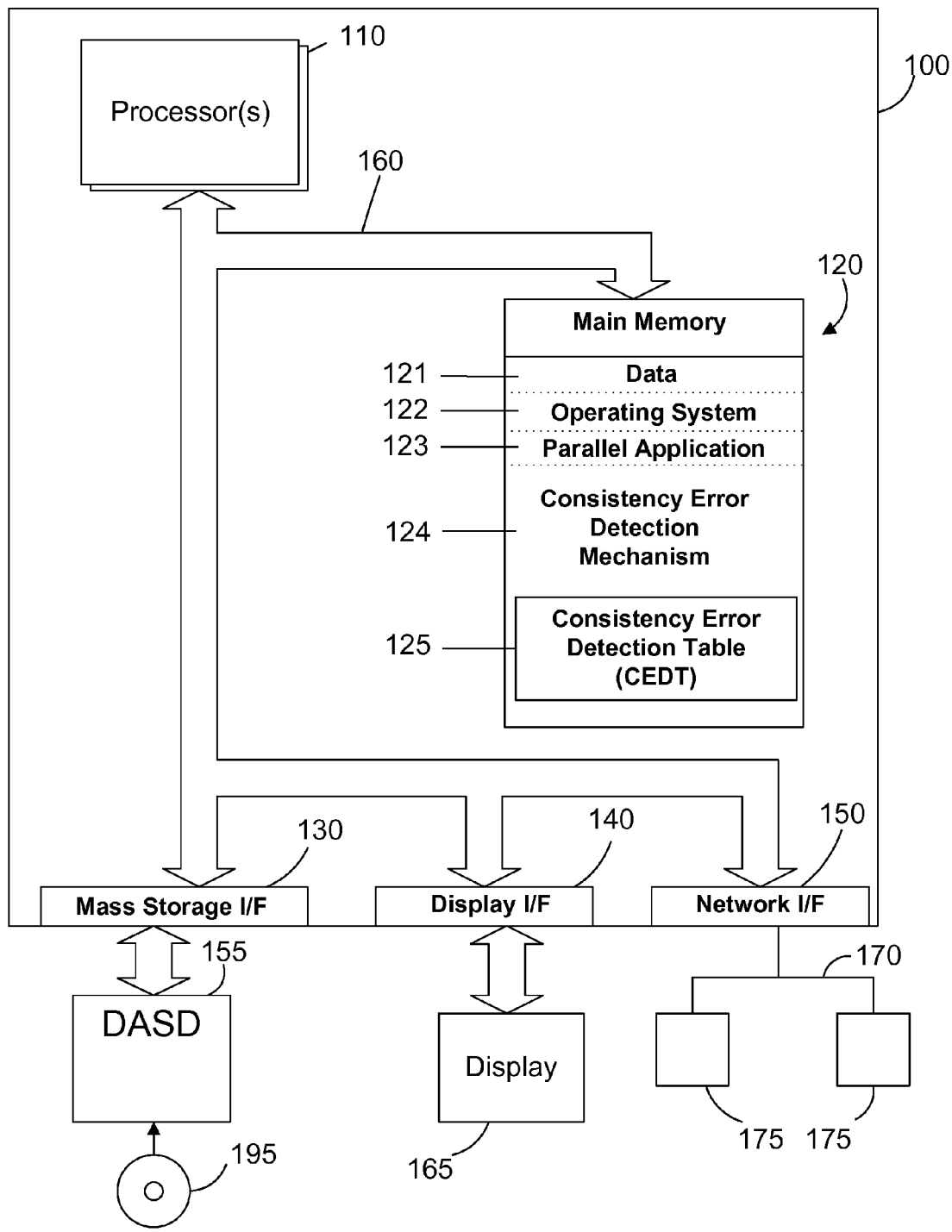
FIG. 1 illustrates a block diagram of a computer system apparatus with a consistency error detection mechanism as described herein.

Referring now to FIG. 1, a computer system 100 is one suitable implementation of an apparatus in accordance with the preferred embodiments of the invention. Computer system 100 represents a computer system such as a Power System by International Business Machines Corporation (IBM). However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processor(s) 110, a main memory 120, a mass storage interface 130, a display interface 140, and a network interface 150. These system components are interconnected through the use of a system bus 160. Mass storage interface 130 is used to connect mass storage devices such as a direct access storage device (DASD) 155 to computer system 100. One specific type of direct access storage device 155 is a readable and writable CD RW drive, which may store data to and read data from a CD RW 195. Alternatively, the DASD may be a storage device such as a magnetic disk drive or a solid state disk drive.

Main memory 120 in accordance with the preferred embodiments contains data 121, and an operating system 122. Data 121 represents any data that serves as input to or output from any program in computer system 100. Operating system 122 represents an appropriate multitasking operating system known in the industry such as "IBM i", AIX (Advanced Interactive eXecutive) or Linux; however, those skilled in the art will appreciate that the spirit and scope of the present invention is not limited to any one operating system. The main memory 120 also includes a parallel application 123, a consistency error detection mechanism (CEDM) 124 with a consistency error detection table (CEDT) 125 as described further herein.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, parallel application 123 and the CEDM 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Computer system 100 is shown to contain one or more processors 110 with a single bus. Those skilled in the art will appreciate that the consistency error detection mechanism may be practiced using a computer system that has multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figures 2, 3:
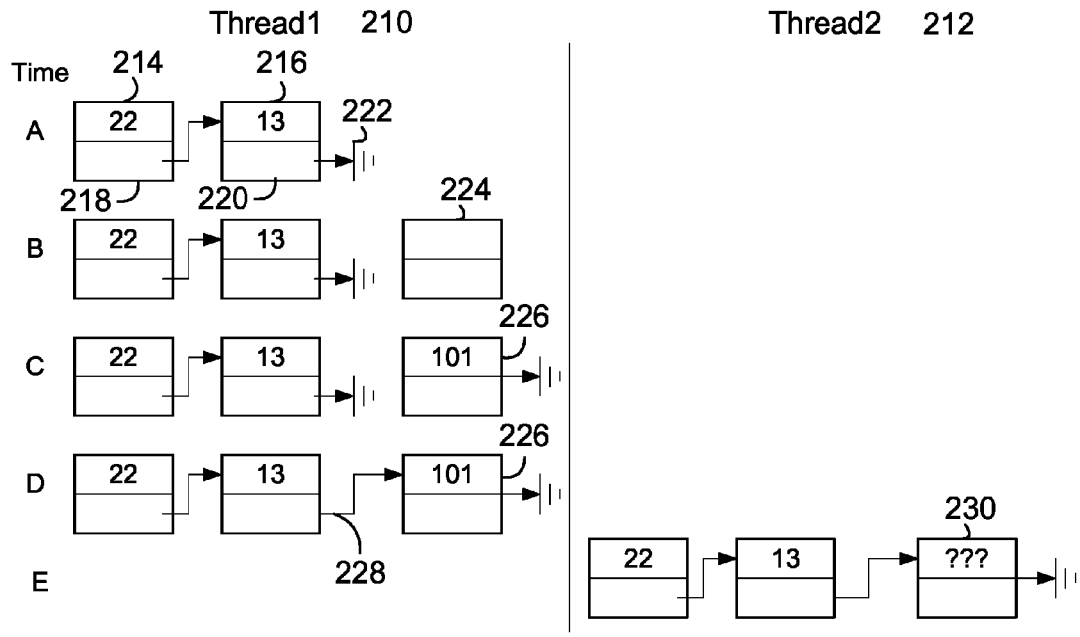
FIG. 2 illustrates an error resulting from weak data consistency in a computer system.
FIG. 3 represents a block diagram of assembly code used for an example of a consistency error.

FIG. 2 illustrates an error resulting from weak data consistency in a computer system. FIG. 2 represents a software application building a linked list with actions performed at different times by two threads, Thread1 210 and Thread2 212. The left side of FIG. 2 shows actions by Thread1 210 and the right side of FIG. 2 illustrates actions by Thread 212. At time "A" we have a shared linked list that consists of a first record 214 with data "22" and a second record 216 with data "13". The first record 214 has a pointer 218 that points to the second record 216. The second record has a pointer 220 that indicates the end of the linked list as represented by the end of list symbol 222. At time "B" Thread1 210 adds a third record 224 to the list. At this point there is no stale pointer problem because the other threads will not find this node because it is not connected to the list. At time "C" Thread1 210 fills in the value of "101" to the new node 226. The list is still safe from errors because the new node 226 is not part of the list since there is no reference that another thread could find it and use it. At time "D" Thread1 210 updates the next pointer 228 in the last record of the list to point to the new record 226. The problem occurs if a consumer thread uses a data value produced by a producer thread that is stale and not consistent. For example, at time E, Thread2 212 sees the new pointer value 228 in the next pointer field and accesses it before the memory it points to (the memory that makes up the new record) is updated with the latest value by the hardware. In this case, rather than seeing "101" in the data field, Thread2 212 may see a random value 230. This error may occur on systems that are weakly consistent where values may not be updated and visible to other processors in the order they occurred. This is possible even though the value of the next field was updated after the node data on the first thread, but on a different processor which is running Thread2, the update to the next field may appear BEFORE the update to the data field. This could be due to a busy memory bus, or any number of other reasons that the hardware chooses to not immediately make the change visible to other processors.

To ensure proper ordering of loads and stores within a weak consistency system, a synchronization instruction such as light-weight synchronization or "lwsync" is used by the programmer to tell the system to prevent the problem illustrated in FIG. 2. The synchronization instruction forces the hardware to respect the ordering of the stores and the loads in code, rather than rearranging them for performance reasons. In the above example, a synchronization instruction such as lwsync may be placed between step C and D and similarly placed at the beginning of the instructions in Thread2 212 to ensure that the problem above would not occur. However, sometimes the programmer fails to use a synchronization instruction or uses it improperly which results in consistency errors in a weak consistency system. The consistency error detection mechanism described herein detects weak consistency errors that result in the use of stale data by the application and alert the user/programmer to the weak consistency errors in the application program.

FIG. 3 illustrates an example of assembly language code 300 that is part of the parallel application 123 (FIG. 1). The assembly language shown in this example is a highly simplified example of assembly language code. In the illustrated example, the assembly language code 124 includes code for Thread1 310 and Thread2 312. For Thread1 310 there are three store instructions and some initial conditions 314. Similarly, for Thread2 312 there are two load instructions and some ending conditions 316. In this example, we assume that Thread1 310 is executed first, followed by Thread2 312. The first store operation in Thread1 310 stores the value "0000" in the address location 3000 which is indicated by the register R1. The second store operation in Thread1 312 stores the value "ABCD" in address location 3008. The third store operation in Thread1 312 stores the value "3000" at the address location 2000. The first load operation of Thread2 312 loads the contents of address location of 2000 with should be the value of "3000" stored by Thread1 310. The value of "3000" is stored in register R3 as to be used by the next load operation. The second load operation of Thread2 312 loads the contents of address location 3008 into register R4. The value loaded from address location 3008 should be "ABCD" stored previously by Thread1 310. This assembly code will be used to further describe an example of detecting the use of stale data with reference to FIG. 4.

As introduced above, the consistency error detection mechanism uses object code injection to build a consistency error detection table during the operation of an application. Object code injection is known in the prior art. Object code injection is done when an application is compiled. Object code injection means additional object code is included into the source code to perform some function, typically a debug or analysis function. The object code may be assembly language or machine code that is generated by a compiler for a computer language like C++. In the present case, at compilation, additional object code is included into the source code to build the consistency error detection table (CEDT). For each store and load operation in the compiled code, additional object code is added that will add a record to the CEDT. Thus the additional code injected into the object code of the application builds the CEDT by adding a record with a time, instruction, address and value for each load and store operation of the application code. The CEDT is described further below. When the application is paused, the consistency error detection mechanism uses the consistency error detection table to detect weak consistency errors that result in the use of stale data by the application. The application may be paused using a periodic interrupt or an interrupt triggered on a desired event. The application may also be paused by a time or parameter set by a user.

FIG. 4A illustrates an example of a consistency error detection table (CEDT) 125 preferably created and used by the consistency error detection mechanism 124 (FIG. 1). Data in the CEDT is divided by the thread associated with the data. In the illustrated example, the CEDT includes data for Thread1 310 and Thread2 312. For Thread1 310 there are columns for time 314, instruction 316, address 318 and value 320. Similarly, for Thread2 312 there are columns for time 322, instruction 324, address 326 and value 328. The time column 314, 322 holds a time stamp when the instruction 316, 324 is processed by the application. In the example data shown in FIG. 3, the time stamp is a number between 100 and 202 representing a relative time. The instruction column 316 indicates the type of memory instruction, such as "load" or "store". The value column 318 stores the value used in the operation which will be either the data stored by a store operation or the data retrieved by a load operation. The value stored in the value column will be used by the consistency error detection mechanism to analyze the code for consistency errors.

The data in FIG. 4A illustrates an example of a consistency error detection table (CEDT) 125 created by the injected object code in response to the assembly code 300 shown in FIG. 3. In this example, the data is stored by Thread1 312 and read by Thread2 312 such that there are no stale values/records to produce a consistency error. The first store operation in the assembly code of Thread1 310 is instrumented with code using object code insertion as described above to create the first record at time "100" in the time column 314. The record further includes the instruction "store" to address "3000" with a value of "0000". Similarly, a record at time "101" is a store to address "3008" a value of "ABCD", and a record at time "102" is a store to address "2000" a value of "3000". In this first example of FIG. 4A we assume that Thread2 executes after Thread1 and Thread2 timely sees the new values stored by Thread1. Thus, at the first load at time "200" loads the value "3000" from address "2000". The second load operation then uses the contents of address location "3008" to load the value "ABCD" stored previously by Thread1 310. Since this is the updated value, the consistency error detection mechanism would detect no use of stale data in these records and would not report an error.

The data in FIG. 4B illustrates another example of a consistency error detection table (CEDT) 125 created by the injected object code in response to the assembly code 125 shown in FIG. 3. In this example, the Thread2 does not load the updated values stored by Thread1 but there is no consistency error. The store operations in the assembly code of Thread1 312 are the same as the previous example. In this second example of FIG. 4B we assume that the first load of Thread2 does not see the last store operation of Thread1. This could occur where the values from execution of Thread1 have not been written out to memory by the hardware, or when the results written out to memory have not been made available to Thread2. Thus, the first load at time "200" loads a stale value of "0" from address "2000" since the data in location "2000" was not initialized by Thread1. The second load operation would not be done due to a null pointer check done by the processor. Since the pointer value is stale and not used, there is no use of inconsistent data in these records and the consistency error detection mechanism would not report an error.

The data in FIG. 4C illustrates another example of a consistency error detection table (CEDT) 125 created by the injected object code in response to the assembly code 125 shown in FIG. 3. In this example, the stored data is not made available to Thread2 such that a consistency error is detected. The store operations in the assembly code of Thread1 312 are the same as the previous example. In this third example of FIG. 4C, the store at time 102 is made visible to Thread2 before time 200, but the store at time 101 is not made visible to Thread2 until after the time 202. Thus, the first load at time "200" loads the updated value of "3000" from address "2000" since the data in location "2000" was initialized by Thread1. The second load operation then uses the contents of address location "3000" to load an unknown value "EEEE". Since the pointer value was updated but the data was not initialized (the updated data of "ABCD" was not observed by Thread2), there is use of inconsistent data in these records and the consistency error detection mechanism would report an error.

As introduced above, the consistency error detection mechanism builds the CEDT to identify consistency errors like that illustrated in FIG. 4C. In practice the CEDT would contain a large number of records and may contain many records between the related records shown in FIG. 4C. The consistency error detection mechanism processes these many records to identify the consistency errors. The consistency errors are where there is a match between a value and an address that is stored and a load of that same address at a later point in time where the load value is not consistent with the stored value. In an exemplary consistency error detection mechanism a list is made of store and loads to the same address from the CEDT. The consistency error detection mechanism then finds matches in the two lists where the loads are inconsistent to detect consistency errors. This example is further described with reference to FIG. 6.

Figure 5:
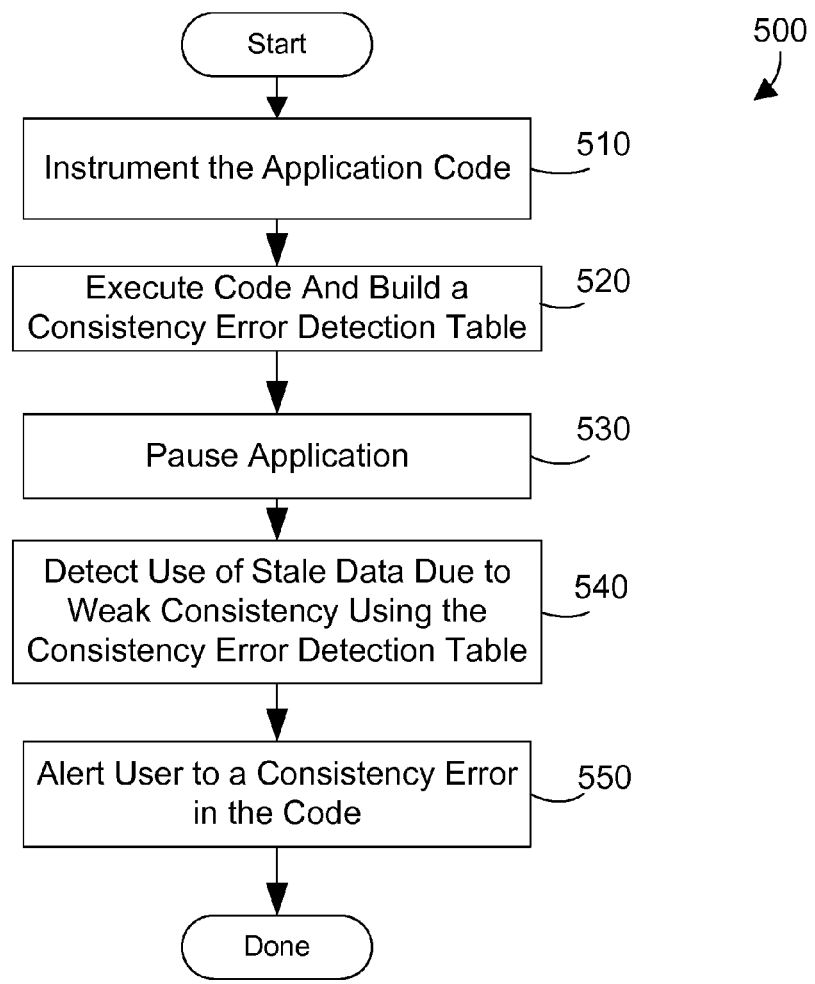
FIG. 5 illustrates an example flow diagram of a consistency error detection mechanism as described herein.

Referring now to FIG. 5, a flow diagram shows a method 500 for detecting the use of stale data values due to weak consistency between parallel threads on the computer system. The method 500 is presented as a series of steps. These steps are preferably performed by a computer software program described above as consistency error detection mechanism 124 but may include steps performed by the user or other software entities in the computer system. The consistency error detection mechanism 124 instruments the application code using object code injection (step 510). The code injected in step 510, when executed, will build the consistency error detection table. Upon execution of the application, the instrumented code builds the consistency error detection table (step 520). The application is paused (step 530). The consistency error detection mechanism then detects the use of stale data due to weak consistency errors using the consistency error detection table (step 540). The user is alerted to the consistency error in the code by logging or flagging the error (step 550). Method 500 may repeat until the application program has finished running. The method 500 is then done.

Figure 6:
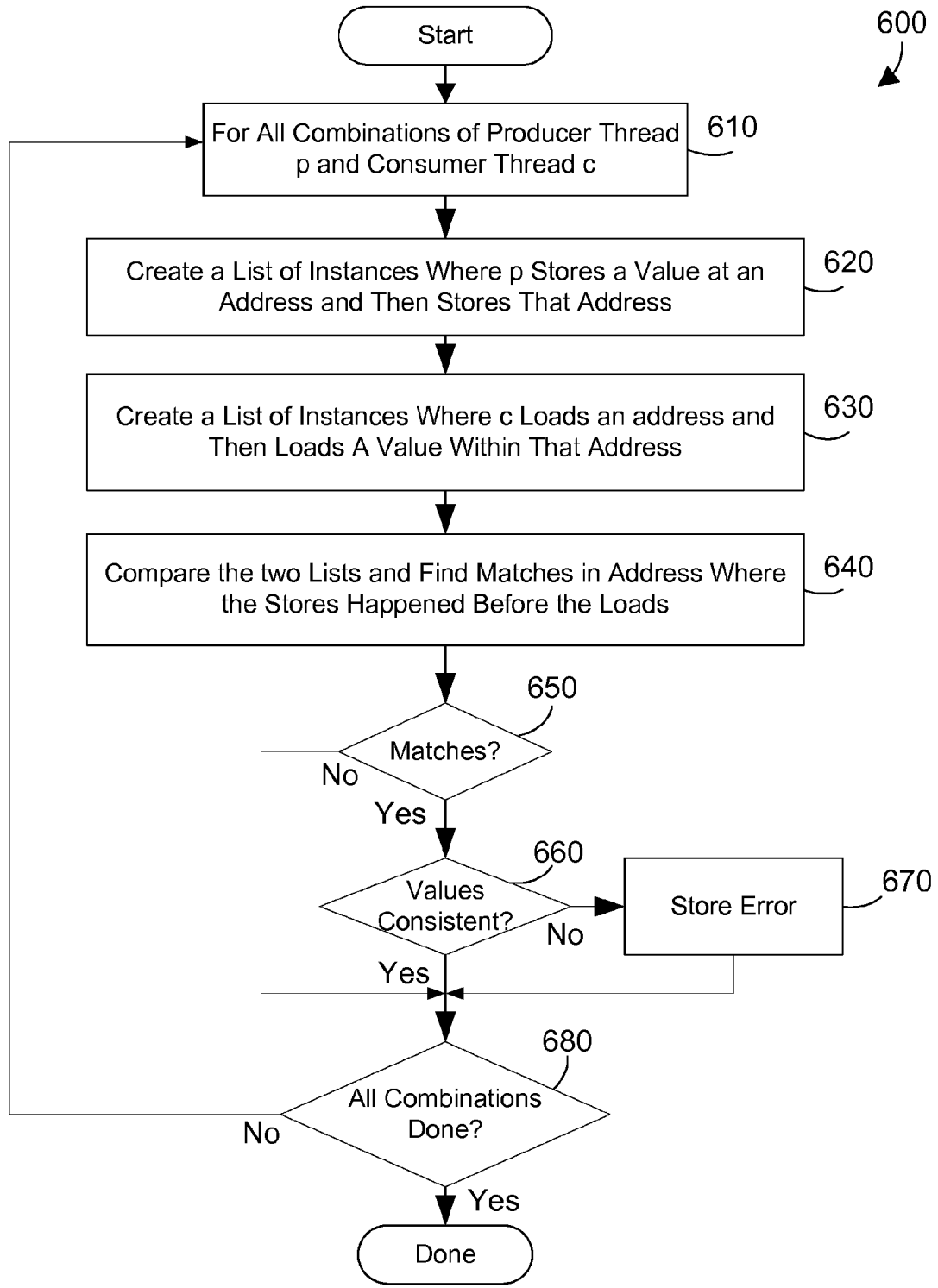
FIG. 6 is another example flow diagram of a consistency error detection mechanism as described herein.

Referring now to FIG. 6, a flow diagram shows a method for detecting the use of stale data values due to weak consistency between parallel threads on the computer system using a consistency error detection table. Method 600 provides additional details for an example method of carrying out step 540 in FIG. 5 to detect the use of stale data due to weak consistency using a consistency error detection table (CEDT). The method begins by processing the CEDT for all combinations of a producer thread "p" and a consumer thread "c" (step 610). Create a list of instances where "p" stores a value at an address and then stores that address (step 620). Create a list of instances where "c" loads an address and then loads a value within that address (step 630). Compare the two lists and find matches in address where the stores happen before the loads (step 640). If there are no matches (step 650=no) then go to step 680. If there are matches (step 650=yes) then determine if the values in the matched records are consistent (step 660). If the values are not consistent (step 660=no) then store or log an error (step 670) and go to step 680. If the load values are consistent with the store values (step 660=yes) then go to step 680. If all the combinations of "p" and "c" are not done (step 680=no) then return to step 610. If all the combinations of "p" and "c" are done (step 680=yes) then the method is done.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims are directed to an apparatus and method for detecting the use of stale data values due to weak consistency between parallel threads on the computer system. A consistency error detection mechanism uses object code injection to build a consistency error detection table during the operation of an application to detect weak consistency errors that result in the use of stale data by the application.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
    at least one processor;
    a memory coupled to the at least one processor;
    a parallel application residing in the memory and executed by the at least one processor;
    a consistency error detection mechanism residing in the memory and executed by the at least one processor that builds a consistency error detection table during operation of parallel threads of the parallel application;
    wherein the consistency error detection mechanism detects the use of stale data values due to weak consistency between parallel threads of the parallel application by analyzing the consistency error detection table; and
    wherein the consistency error detection mechanism builds the consistency error detection table during the operation of the parallel application using object code injected into the parallel application.

2. The apparatus of claim 1 wherein the consistency error detection mechanism analyzes the consistency error detection table when the parallel application is paused to detect the use of stale data by the parallel application.

3. The apparatus of claim 2 wherein the consistency error detection mechanism determines a consistency error where there is a match between a first thread using a stored address to store a stored value and a second thread loading a load value from the stored address at a later point in time where the load value is not consistent with the stored value.

4. The apparatus of claim 2 wherein the consistency error detection mechanism creates a list of stores and a list of loads to the same address from the consistency error detection table and then finds matches in the two lists where the loads and stores are inconsistent to detect consistency errors.

5. The apparatus of claim 1 wherein the consistency error detection mechanism alerts the user/programmer to the consistency errors in the parallel application.

6. The apparatus of claim 1 comprising at least two processors each having a parallel thread.

7. The apparatus of claim 1 wherein the consistency error detection table comprises records for a plurality of application threads where each record comprises a time, an instruction, an address and a value stored at the address.

8. An apparatus comprising:
    at least one processor;
    a memory coupled to the at least one processor;
    a parallel application residing in the memory and executed by the at least one processor;
    a consistency error detection mechanism residing in the memory and executed by the at least one processor that builds a consistency error detection table during operation of parallel threads of the parallel application;
    wherein the consistency error detection mechanism detects the use of stale data values due to weak consistency between parallel threads of the parallel application by analyzing the consistency error detection table; and
    wherein the consistency error detection mechanism analyzes the consistency error detection table when the parallel application is paused to detect the use of stale data by the parallel application.

9. The apparatus of claim 8 wherein the consistency error detection mechanism determines a consistency error where there is a match between a first thread using a stored address to store a stored value and a second thread loading a load value from the stored address at a later point in time where the load value is not consistent with the stored value.

10. The apparatus of claim 8 wherein the consistency error detection mechanism creates a list of stores and a list of loads to the same address from the consistency error detection table and then finds matches in the two lists where the loads and stores are inconsistent to detect consistency errors.

11. The apparatus of claim 8 wherein the consistency error detection table comprises records for a plurality of application threads where each record comprises a time, an instruction, an address and a value stored at the address.

12. An apparatus comprising:
    at least one processor;
    a memory coupled to the at least one processor;
    a parallel application residing in the memory and executed by the at least one processor;
    a consistency error detection mechanism residing in the memory and executed by the at least one processor that builds a consistency error detection table during operation of parallel threads of the parallel application;
    wherein the consistency error detection mechanism detects the use of stale data values due to weak consistency between parallel threads of the parallel application by analyzing the consistency error detection table; and
    wherein the consistency error detection mechanism alerts the user/programmer to the consistency errors in the parallel application.

13. The apparatus of claim 12 wherein the consistency error detection table comprises records for a plurality of application threads where each record comprises a time, an instruction, an address and a value stored at the address.

* * * * *